United States Patent
Beale (10) Patent No.: US 9,094,095 B2
(45) Date of Patent: Jul. 28, 2015

(54) SUPPORT OF PLURAL BANDWIDTHS IN A TELECOMMUNICATIONS SYSTEM

(75) Inventor: Martin W. Beale, Bristol (GB)

(73) Assignee: NVIDIA CORPORATION, Santa Clara, CA (US)

( * ) Notice: Subject to any disclaimer, the term of this patent is extended or adjusted under 35 U.S.C. 154(b) by 561 days.

(21) Appl. No.: 13/212,890

(22) Filed: Aug. 18, 2011

(65) Prior Publication Data

US 2011/0299507 A1     Dec. 8, 2011

Related U.S. Application Data

(63) Continuation of application No. 10/537,195, filed as application No. PCT/GB03/05361 on Dec. 9, 2003.

(30) Foreign Application Priority Data

Dec. 9, 2002    (GB)  .................................... 0228613.6

(51) Int. Cl.
     *H04B 7/26*      (2006.01)

(52) U.S. Cl.
     CPC .............. *H04B 7/264* (2013.01); *H04B 7/2618* (2013.01); *H04B 2201/70703* (2013.01)

(58) Field of Classification Search
     USPC ......... 370/319–322, 324, 326, 328, 330, 337, 370/342–349, 436, 437, 441–443, 462
See application file for complete search history.

(56) References Cited

U.S. PATENT DOCUMENTS

| | | | |
|---|---|---|---|
| 5,371,734 A | 12/1994 | Fischer | |
| 5,446,739 A | 8/1995 | Nakano et al. | |
| 5,974,042 A | 10/1999 | Frank et al. | |
| 6,018,528 A | 1/2000 | Gitlin et al. | |
| 6,088,578 A * | 7/2000 | Manning et al. | ................. 455/68 |
| 6,115,390 A | 9/2000 | Chuah | |
| 6,370,160 B1 | 4/2002 | Knutson et al. | |
| 6,438,155 B1 | 8/2002 | Beale | |
| 6,563,859 B1 | 5/2003 | Oishi et al. | |
| 6,721,267 B2 * | 4/2004 | Hiben et al. | .................. 370/206 |

(Continued)

FOREIGN PATENT DOCUMENTS

| | | |
|---|---|---|
| EP | 0 680 168 A2 | 11/1995 |
| EP | 0 841 763 A1 | 5/1998 |

(Continued)

OTHER PUBLICATIONS

Korean Preliminary Office Action and its English Translation dated Nov. 7, 2009.

(Continued)

*Primary Examiner* — Alvin Zhu (57) ABSTRACT

In a CDMA system (100), two chip rates in a TDD cell are supported by: transmitting signals in the system in a frame (400) having a plurality of timeslots; operating at least a first one (0-8) of the plurality of timeslots in the frame at a lower chip rate; and operating at least a second one (9-14) of the plurality of timeslots in the frame at a higher chip rate. This provides the following advantages: provides backwards compatibility of a network including higher chip rate functionality with existing lower chip rate user equipment; allows greater network capacity during the transition phase from a low chip rate network to a high chip rate network; and allows a network operator with a high chip rate network to provide service to roaming users from low chip rate networks.

24 Claims, 7 Drawing Sheets key lower chip rate (3.84Mcps) timeslot higher chip rate (7.68Mcps) timeslot (56) References Cited

U.S. PATENT DOCUMENTS

| | | | |
|---|---|---|---|
| 6,741,577 | B1 | 5/2004 | Henon |
| 6,760,365 | B2 | 7/2004 | Demir et al. |
| 6,885,691 | B1 | 4/2005 | Lyu |
| RE38,808 | E | 10/2005 | Schuchman et al. |
| 6,996,162 | B1 | 2/2006 | Hosur et al. |
| 7,012,908 | B2 | 3/2006 | Sasaki |
| 7,089,008 | B1 | 8/2006 | Back et al. |
| 7,099,375 | B2 | 8/2006 | Jones et al. |
| 7,103,310 | B2 | 9/2006 | Lucidarme et al. |
| 7,123,942 | B2 | 10/2006 | El Nahas El Homsi |
| 7,200,124 | B2 | 4/2007 | Kim et al. |
| 7,327,780 | B2 | 2/2008 | Oates et al. |
| 7,362,829 | B2 | 4/2008 | Ojard |
| 7,400,894 | B2 | 7/2008 | Ebner et al. |
| 7,672,674 | B2 * | 3/2010 | Mahany et al. ............ 455/452.2 |
| 7,894,802 | B2 | 2/2011 | Schniedenharn |
| 2002/0080816 | A1 * | 6/2002 | Spinar et al. .................. 370/449 |
| 2005/0075125 | A1 | 4/2005 | Bada et al. |
| 2005/0201319 | A1 | 9/2005 | Lee et al. |
| 2007/0081489 | A1 | 4/2007 | Anderson et al. |
| 2007/0104085 | A1 | 5/2007 | Sambhwani et al. |

FOREIGN PATENT DOCUMENTS

| | | |
|---|---|---|
| EP | 0 876 008 A1 | 11/1998 |
| EP | 0 701 337 A3 | 8/2000 |
| EP | 1075104 A2 | 2/2001 |
| GB | 2396275 A | 6/2004 |
| JP | 6-276176 | 9/1994 |
| JP | 7303090 A | 11/1995 |
| JP | 10-32579 | 2/1998 |
| JP | 2000-232431 | 8/2000 |
| JP | 2000286873 A | 10/2000 |
| WO | 01/11911 A1 | 2/2001 |
| WO | WO 01/52588 A1 | 7/2001 |

OTHER PUBLICATIONS

PCT International Search Report from International Application No. PCT/GB03/05361 dated Dec. 10, 2004.

3rd Generation Partnership Project; Technical Specification Group Radio Access Network; Physical layer—General description (Release 6) 3GPP TS 25.201 V6.2.0 Jun. 2005.

Translation of Japanese Office Action Dated Aug. 25, 2009 issued to Japanese Patent Application No. 2004-558817.

Great Britain Search Report mailed Apr. 17, 2003, for Great Britain Application No. 0228613.6 filed Dec. 9, 2002, 2 pages.

Great Britain Examination Report mailed Jul. 8, 2005, for Great Britain Application No. GB0228613.6 Filed Dec. 9, 2002, 5 pages.

International Search Report mailed Dec. 10, 2004, for PCT Application No. PCT/GB03/05361 filed Dec. 9, 2003, 3 pages.

3GPP (Mar. 2001) "3rd Generation Partnership Project; Technical Specification Group (TSG); Radio Access Network (RAN): 1.28 Mcps Functionality for UTRA TDD Physical Layer (Release 4)," 3GPP TR 25.928 V4.01.1, pp. 1-109.

3GPP (Jan. 2002) "3rd Generation Partnership Project; Technical Specification Group Services and System Aspects; General Packet Radio Service (GPRS); Service Description; Stage 2 (Release 1999)," 3GPP TS 23.060 V3.10.0, pp. 1-192.

3GPP (Jun. 2002) "3rd Generation Partnership Project; Technical Specification Group Radio Access Network; UTRAN Overall Description (Release 1999)," 3GPP TS 25.401 V3.10.0, pp. 1-38.

3GPP (Sep. 2002). "3rd Generation Partnership Project; Technical Specification Group Radio Access Network; Physical Channels and Mapping of Transport Channels onto Physical Channels (TDD) (Release 4)," 3GPP TS 25.221 V4.6.0, pp. 1-91.

English Translation of Japanese Office Action, Mailing date Aug. 7, 2012, Japanese Patent Application No. 2010-237474, Examiner Toshiyuki Tabata, 5 pages.

* cited by examiner

SUPPORT OF PLURAL BANDWIDTHS IN A TELECOMMUNICATIONS SYSTEM

RELATED APPLICATION(S)

This application is a continuation of and claims the benefit of U.S. patent application Ser. No. 10/537,195, filed on Jun. 2, 2005, which application claims the benefit of and is a 371 filing of PCT Patent Application No. PCT/GB03/05361, Filed Dec. 9, 2003, which application claims the benefit of United Kingdom Application No. GB 0228613.6 filed Dec. 9, 2002. The content of these documents is fully incorporated herein in their entirety.

FIELD OF THE INVENTION

This invention relates to code division multiple access (CDMA) systems, and particularly (though not exclusively) to wireless CDMA systems operating in time division duplex (TDD) mode.

BACKGROUND OF THE INVENTION

In the field of this invention it is known that there are currently code division multiple access communications (CDMA) systems that operate at a single chip rate. As demand grows for bandwidth intensive applications, telecommunications will have to be carried at ever higher chip rates. It may be difficult for an organisation that operates a telecommunications network (an operator) to perform the transition between operating a lower chip rate and a higher chip rate network.

The existing method to manage the transition between operating at a lower chip rate and a higher chip rate is for the operator to fully roll out a lower chip rate network before rolling out a higher chip rate network. If there are "islands" of higher chip rate coverage, the network will be able to hand over (to the high chip rate network cells) users with equipment capable of operation at both the lower and higher chip rate who enter the "island": this provides some element of backward compatibility between the low and high chip rate networks. During such a transition period, the network operator will provide some subscribers with user equipment that is capable of operating at both the lower and the higher chip rates. During this transition period, the operator will only be able to use its lower chip rate network equipment to service the majority of users: only those (probably new) users that have been supplied with user equipment capable of operating at the higher chip rate will be able to get service from the higher chip rate network equipment.

However, a problem with the above-described existing method of managing the transition between high and low chip rates is that there is a time during which the network operator is investing in higher chip rate equipment (presumably since the network operator believes that more network capacity is required), but is unable to gain significant revenue from users on this equipment (only those users who have been supplied with dual mode low chip rate/high chip rate equipment will be able to use the newly installed high chip rate equipment). There is thus a built-in reluctance for the network operator to upgrade its network to higher chip rate equipment. In this case, users may suffer from a poorer service, network operators may suffer from either missed revenue that could be obtained from new and enhanced services at the higher chip rate or having to invest in network equipment from which little revenue is additionally obtained, equipment providers may suffer from network operators being unwilling to invest in higher chip rate network equipment until users have been upgraded to higher chip rate user equipment.

A further problem arises in the case where a network operates equipment at a higher chip rate and users roam onto that network with lower chip rate equipment. If the user's equipment is incapable of operating at the higher chip rate, the user will not receive service and the network will lose possible revenue that could have been derived from the roaming user.

A need therefore exists for support of multiple chip rates wherein the abovementioned disadvantage(s) may be alleviated.

STATEMENT OF THE INVENTION

In accordance with a first aspect of the present invention there is provided a method, for supporting of plurality of chip rates in a code division multiple access (CDMA) system, as claimed in claim 1.

In accordance with a second aspect of the present invention there is provided a code division multiple access (CDMA) system, for supporting a plurality of chip rates, as claimed in claim 24.

In accordance with a second aspect of the present invention there is provided a base station, for use in a code division multiple access (CDMA) system supporting a plurality of chip rates, as claimed in claim 14.

In accordance with a third aspect of the present invention there is provided user equipment, for use in a CDMA system supporting a plurality of chip rates, as claimed in claim 15.

BRIEF DESCRIPTION OF THE DRAWINGS

Several schemes for support of multiple chip rates in a CDMA TDD cell, incorporating the present invention will now be described, by way of example only, with reference to the accompanying drawings, in which:

FIG. 7 shows a block schematic diagram illustrating a possible timeslot structure for multi chip rate operation using multiple low chip rate carriers Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DESCRIPTION OF THE PREFERRED EMBODIMENTS

Figure 1:
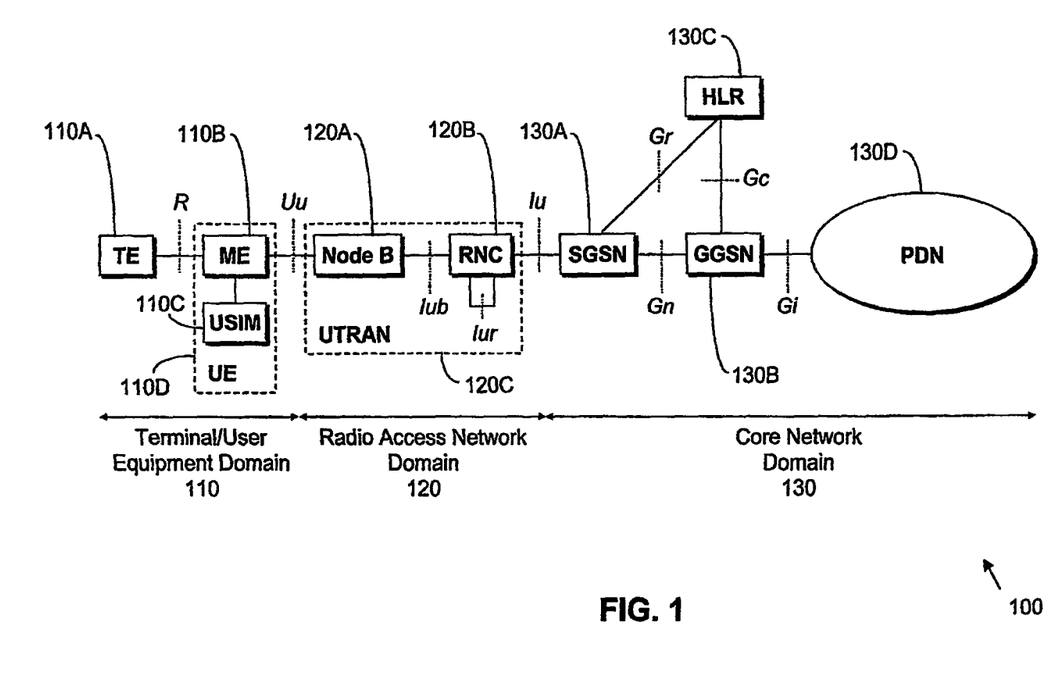
FIG. 1 shows a block schematic diagram illustrating a 3GPP radio communication system in which the present invention may be used.

Referring firstly to FIG. 1, a typical, standard UMTS Radio Access Network (UTRAN) system 100 is conveniently considered as comprising: a terminal/user equipment domain 110; a UMTS Terrestrial Radio Access Network domain 120; and an infrastructure domain 130.

In the terminal/user equipment domain 110, terminal equipment (TE) 110A is connected to mobile equipment (ME) 110B via the wired or wireless R interface. The ME 110B is also connected to a user service identity module (USIM) 110C; the ME 110B and the USIM 110C together are considered as a user equipment (UE) 110D. The UE 110D communicates data with a Node B (base station) 120A in the radio access network domain (120) via the wireless Uu interface. Within the radio access network domain 120, the Node B 120A communicates with a radio network controller (RNC) 120B via the Iub interface. The RNC 120B communicates with other RNC's (not shown) via the Iur interface. The Node B 120A and the RNC 120B together form the UTRAN 120C. The RNC 120B communicates with a serving GPRS service node (SGSN) 130A in the core network domain 130 via the Iu interface. Within the core network domain 130, the SGSN 130A communicates with a gateway GPRS support node 130B via the Gn interface; the SGSN 130A and the GGSN 130B communicate with a home location register (HLR) server 130C via the Gr interface and the Gc interface respectively. The GGSN 130B communicates with public data network 130D via the Gi interface.

Thus, the elements RNC 120B, SGSN 130A and GGSN 130B are conventionally provided as discrete and separate units (on their own respective software/hardware platforms) divided across the radio access network domain (120) and the core network domain (130), as shown the FIG. 1.

The RNC 120B is the UTRAN element responsible for the control and allocation of resources for numerous Node B's 120A; typically 50 to 100 Node B's may be controlled by one RNC. The RNC also provides reliable delivery of user traffic over the air interfaces. RNC's communicate with each other (via the Iur interface) to support handover and macrodiversity.

The SGSN 130A is the UMTS Core Network element responsible for Session Control and interface to the HLR. The SGSN keeps track of the location of an individual UE and performs security functions and access control. The SGSN is a large centralised controller for many RNCs.

The GGSN 130B is the UMTS Core Network element responsible for concentrating and tunnelling user data within the core packet network to the ultimate destination (e.g., internet service provider—ISP).

Such a UTRAN system and its operation are described more fully in the 3.sup.rd Generation Partnership Project technical specification documents 3GPP TS 25.401, 3GPP TS 23.060, and related documents, available from the 3GPP website at www.3gpp.org, and need not be described herein in more detail.

Several embodiments of the present invention are described below, beginning with a main embodiment, which is a general example that is applicable to the further described embodiments.

In the main embodiment of present invention, the system 100 is a multiple chip rate system employing a lower chip rate and a higher chip rate. As an example, assume that the chip rates are integer multiples of 3.84 Mcps: the lower chip rate is 3.84 Mcps and the higher chip rate is 7.68 Mcps. As is well known, communication on the wireless interface Uu between UE 110D and Node B 120A occurs in a variety of predefined channels. The timeslot structure, for signalling on the wireless interface Uu between UE 110D and Node B 120A, for a lower chip rate system (assumed to be a chip rate of 3.84 Mcps in this example) could be assigned as shown in FIG. 2.

Figure 2:
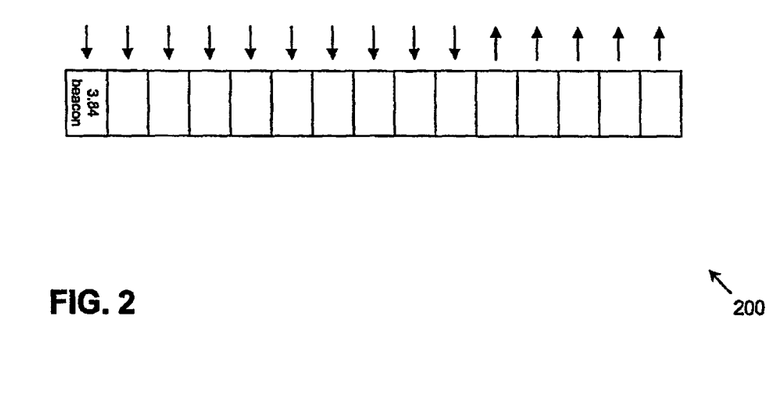
FIG. 2 shows a block schematic diagram illustrating a possible timeslot structure for a low chip rate system.

In FIG. 2, a single frame 200 is shown containing 15 timeslots. 5 timeslots (the right-most 5 timeslots depicted in the figure) are shown as uplink timeslots (for data transmitted in the direction from the user equipment to the network) and 10 timeslots (the left-most 10 timeslots depicted in the figure) are shown in the downlink (for data transmitted in the direction from the network to the user equipment). One of the downlink timeslots (the left-most timeslot depicted in the figure), in this case labeled "3.84 beacon", has a special purpose: it used to contain "beacon" data for performing a beacon function (as is well understood in a 3GPP system, and need not be described in further detail). However, it will be understood that in general this timeslot need not necessarily be used to perform a beacon function.

Figure 3:
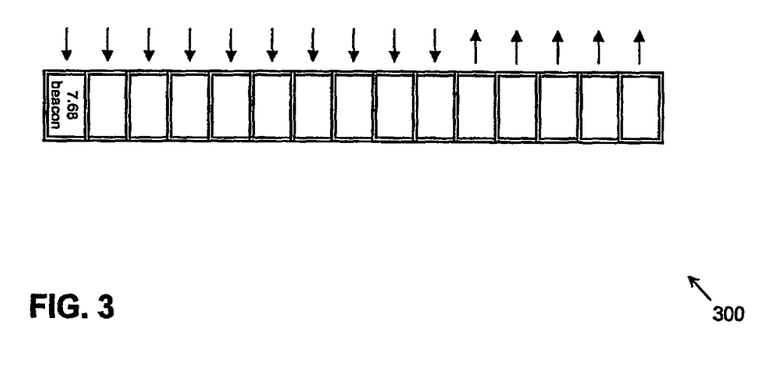
FIG. 3 shows a block schematic diagram illustrating a possible timeslot structure for a high chip rate system.

An example timeslot structure for a higher chip rate system (assumed to be a chip rate of 7.68 Mcps in this example) could be assigned as shown in FIG. 3.

In FIG. 3, a single frame 300 is shown containing 15 timeslots (it is assumed for the purposes of this example that the timeslot duration and frame duration of the high chip rate and low chip rate systems are identical). 5 timeslots (the right-most 5 timeslots depicted in the figure) are shown as uplink timeslots (for data transmitted in the direction from the user equipment to the network) and 10 timeslots (the left-most 10 timeslots depicted in the figure) are shown in the downlink (for data transmitted in the direction from the network to the user equipment). One of the downlink timeslots (the left-most timeslot depicted in the figure), in this case labeled "7.68 beacon", has a special purpose: it used to contain "beacon" data for performing a beacon function (as is well understood in a 3GPP system, and need not be described in further detail). However, it will be understood that in general this timeslot need not necessarily be used to perform a beacon function.

Figure 4:
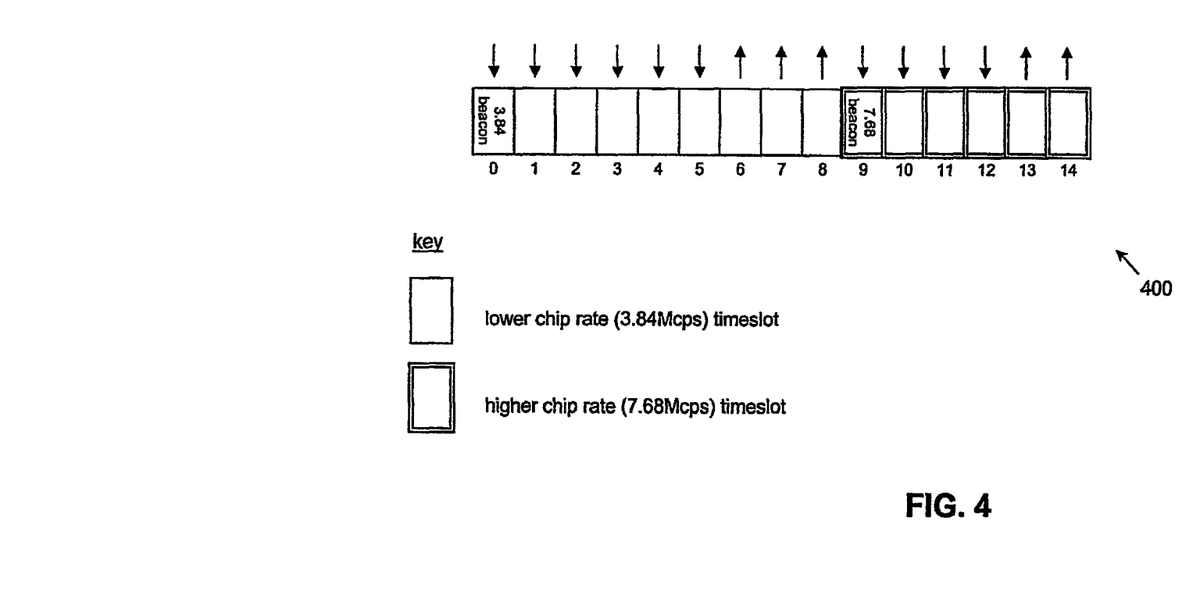
FIG. 4 shows a block schematic diagram illustrating a possible timeslot structure for a mixed chip rate system.

FIG. 4 shows a possible timeslot structure relating to the invention. This figure numbers the timeslots in increasing order. In a subsequent frame, the timeslot numbering would reset to zero for the first timeslot of that subsequent frame and the frame number would increment.

In the timeslot structure 400 shown in FIG. 4, 9 timeslots (timeslots 0-8) are assigned to the lower chip rate (3.84 Mcps). 6 of these timeslots (timeslots 0-5) are downlink timeslots and 3 (timeslots 6-8) are uplink timeslots. One of the lower chip rate downlink timeslots (timeslot 0) is shown as a special purpose timeslot (in this case, it is referred to as the "3.84 beacon" timeslot). In FIG. 4, 6 timeslots (timeslots 9-14) are assigned to the higher chip rate (7.68 Mcps). 4 of these timeslots (timeslots 9-12) are downlink and 2 (timeslots 13 and 14) are uplink timeslots. One of the higher chip rate downlink timeslots (timeslot 9) is shown as a special purpose timeslot (in this case, it is referred to as the "7.68 beacon" timeslot).

Considering the case when a UE that is only capable of operating at the lower chip rate roams into a network employing the timeslot structure shown in FIG. 4, this UE would search for the special purpose ("3.84 beacon") timeslot. When the UE finds the special purpose lower chip rate timeslot, it will recognise the existence of the network cell (in this example, it is assumed that the network is a cellular system) and will camp on that cell. The UE will signal to the network that it exists using the lower chip rate in one of the timeslots 6-8. The network will recognise that the UE is a low chip rate UE and will only assign it resources in timeslots 0-8 in the future (for instance, if it assigns the UE a dedicated resource, it might assign it a single downlink channel in timeslot 5 once per frame and a single uplink channel in timeslot 8 once per frame—note that in a CDMA system, multiple channels may be supported per timeslot).

Now considering the case when a UE that is only capable of operating at the higher chip rate roams into a network employing the timeslot structure shown in FIG. 4, this UE would search for the special purpose ("7.68 beacon") timeslot and would ignore the lower chip rate special purpose ("3.84 beacon") timeslot. When the UE finds the special purpose higher chip rate timeslot, it will recognise the existence of the network cell and will camp on that cell. The UE will signal to the network that it exists using the higher chip rate in the timeslot 13 or 14. The network will recognise that the UE is a high chip rate UE and will only assign it resources in timeslots 9-14 in the future (for instance, if it assigns the UE a dedicated resource, it might assign it a single downlink channel in timeslot 10 once per frame and a single uplink channel in timeslot 14 once per frame—note that in a CDMA system, multiple channels may be supported per timeslot).

When a UE that is capable of operation at either the lower chip rate (3.84 Mcps in this example) or at the higher chip rate (7.68 Mcps in this example) roams into a network employing the timeslot structure in shown in FIG. 4, there are several possible scenarios that can be considered (these are described as "Embodiment 1" and "Embodiment 2" in the following description).

Embodiment 1

In a first scenario, the UE searches for the lower chip rate special purpose slot in preference to the higher chip rate special purpose slot. If the UE finds the lower chip rate special purpose slot, it will notify the cell of its existence and camp on the cell at the lower chip rate.

The UE will inform the network of its capability to operate at the higher chip rate. The network may then decide to handover the UE to the higher chip rate network function. In this case, the UE camps on the higher chip rate in preference to the lower chip rate and the higher chip rate function in the network will allocate higher chip rate resource to the UE (from timeslots 9-14 in this example). In this first scenario, the UE displays some inflexibility between operating at the two chip rates: the UE is capable of changing only slowly from one chip rate to another, thus the network performs handover of dual mode equipment between the two chip rate networks and the different chip rate networks essentially operate independently.

Embodiment 2

In a second scenario, the UE searches for the lower chip rate special purpose slot in preference to the higher chip rate special purpose slot. If the UE finds the lower chip rate special purpose slot, it will notify the cell of its existence and camp on the cell at the lower chip rate. The UE will inform the network of its capability to operate at the higher chip rate. The network may then allocate either lower chip rate (from timeslots 0-8 in this example) or higher chip rate resource (from timeslots 9-14 in this example) to the UE (a single allocation might even span the lower and higher chip rates such that a single allocation contains both lower chip rate and higher chip rate resource, e.g., timeslots 5, 8 and 9). In this second scenario, the UE is capable of operating at both the lower and higher chip rates and can change between chip rates either every timeslot or every frame. In this second scenario, the lower chip rate and higher chip rate portions of the network are able to operate together (this arrangement may provide more capacity than when the higher and lower chip rate network functions operate independently due to trunking efficiency gains).

In this second scenario, the UE must be aware of the chip rates that apply in the slots that it has been allocated. The UE could autonomously detect the chip rate in the slot. This could be done by known methods such as spectral (frequency) analysis of the received data, analysis and comparison of the results of channel estimation, analysis of multi-user detector output, etc.—for example, in the case of channel estimation, channel estimates could be produced at 3.84 Mcps and 7.68 Mcps and then it could be assumed if the 3.84 Mcps channel estimate is better than the 7.68 Mcps channel estimate that the slot is actually 3.84 Mcps. Alternatively, the UE could be told of the chip rate via higher layer signalling in an allocation message or could be told of the chip rate via broadcast higher layer signalling.

Clearly, in the above two scenarios, the UE could alternatively search for the higher chip rate special purpose slot in preference to the lower chip rate and the functionality in this case will be clear to those skilled in the art from the preceding description.

Embodiment 3

Whereas Embodiment 1 and Embodiment 2 described above in relation to FIG. 4 showed a slot structure with a single switching point between the lower chip rate system and the higher chip rate system (in the sense that the lower chip rate system occupied the low indexed timeslots and the high chip rate system occupied the high indexed timeslots), it will be appreciated that there may in fact be multiple switching points between low chip rate and high chip rate systems. A slot structure ("Embodiment 3") with multiple switching points is illustrated in FIG. 5.

The timeslot structure of Embodiment 3 might be used for a variety of reasons. In particular, in the case of a UMTS TDD system, the timeslot structure 500 of FIG. 5 might be used to allow for "synchronisation case 2", which uses beacon slots per frame, one of the beacon slots being slot k, and the other being slot in k+8. As will be understood, "synchronisation case 2" can facilitate inter-frequency and inter-system measurements (the UE can decode the beacon in the current frequency and then 8 slots later, it can look at the beacon on another frequency); it may also aid power control.

Figure 5:
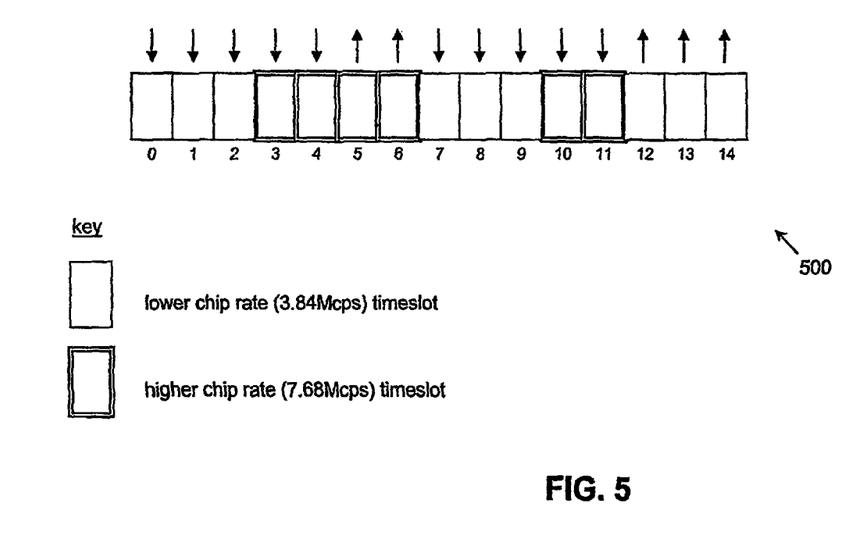
FIG. 5 shows a block schematic diagram illustrating a possible timeslot structure for a mixed chip rate system with multiple switching points.

The example of FIG. 5 illustrates aspects of the operation of the invention in the time domain. Aspects of the operation of the invention in the frequency domain are now considered. The following example embodiments relate to the example embodiments and main embodiment of the invention described previously.

For the following example, assume that the bandwidth required to support the lower chip rate system is $W_{low}$ (for a 3.84 Mcps system, $W_{low}$ is typically 5 MHz) and the bandwidth required to support the high chip rate system is $W_{high}$ (for a 7.68 Mcps system, $W_{high}$ is typically 10 MHz). There are several scenarios for the operation of the lower chip rate timeslots in the frequency domain (these are described as "Embodiment 4" and "Embodiment 5" in the following description). In each of the scenarios, it is assumed that the network operates within a spectral allocation of $W_{high}$ (for example, if the network supports operation at both 3.84 Mcps and 7.68 Mcps, then the spectral allocation for the network as a whole will be the bandwidth required to support a chip rate of 7.68 Mcps which is typically 10 MHz).

Embodiment 4

Figure 6:
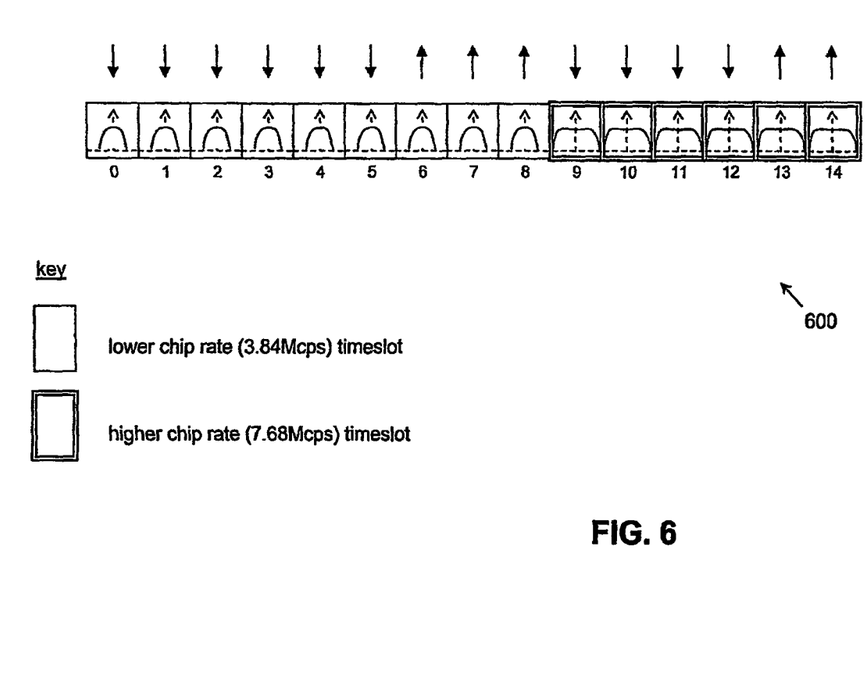
FIG. 6 shows a block schematic diagram illustrating a possible timeslot structure for multi chip rate operation using a single low chip rate carrier.

Referring now to FIG. 6, in a first frequency domain scenario, a timeslot frame structure 600 is employed and the network operates a single 3.84 Mcps network function in the lower chip rate timeslots (timeslots 0-8) and a single 7.68 Mcps network function in the higher chip rate timeslots (timeslots 9-14). In the lower chip rate timeslots (timeslots 0-8), the spectrum of the 3.84 Mcps network function sits centrally in the spectrum allocation of the network as a whole (as illustrated by the waveforms depicted in the lower chip rate timeslots 0-8 in FIG. 6). In this case, the carrier frequency of the 3.84 Mcps network function is the same as the carrier frequency of the 7.68 Mcps network function. This arrangement may be advantageous when dual mode UEs can receive allocations at the two chip rates within the same frame. The main benefit of this single low chip rate system in the low chip rate timeslots may be that Embodiments 1 and 2 fit more easily into this case. Conversely, when there are multiple lower chip rate systems, synthesisers (and other RF components) may need to be continually re-tuned if allocations span the two chip rates. This Embodiment 4 may be used with Embodiments 1 and 2 described above.

Embodiment 5

Figure 7:
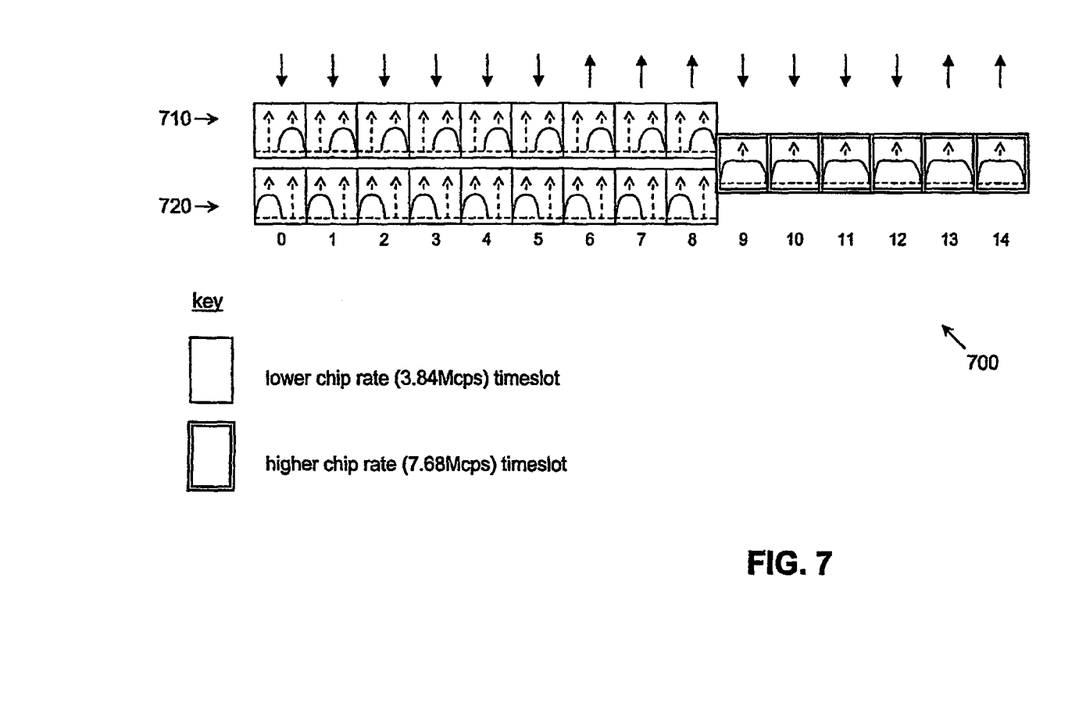

Referring now to FIG. 7, in a second frequency domain scenario, a timeslot frame structure 700 is employed and the network operates two separate 3.84 Mcps network functions in the lower chip rate timeslots (timeslots 0-8) and a single 7.68 Mcps network function in the higher chip rate timeslots (timeslots 9-14). In the lower chip rate timeslots, two separate 3.84 Mcps network functions (710 and 720) coexist at the same time but are separated in frequency. As can be seen in FIG. 7, the waveforms depicted in the lower chip rate timeslots 0-8 in function 710 are centred on a higher frequency, and the waveforms depicted in the lower chip rate timeslots 0-8 in function 720 are centred on a lower frequency offset from the higher frequency in function 710. In this scenario, the network has approximately twice the capacity at the lower chip rate than in the scenario described above (Embodiment 3). In this scenario the network can transfer users by handover operations between low chip rate carriers or between a low chip rate carrier and the high chip rate carrier and vice versa (according to the capabilities of the UE). This Embodiment 5 can be used with Embodiments 1 and 2 described above, though in the case of Embodiment 2 the UE will need to be informed of carrier frequencies and offsets of the one chip rate system relative to the other chip rate system (for example, if the UE is allocated timeslots 5, 8 and 9, the network will need to inform the UE of the carrier frequency of the higher chip rate system relative to the carrier frequency of the lower chip rate system).

It will be understood that the number of timeslots allocated to a particular chip rate may be fixed (as described above) or may be dynamically varied from frame to frame. The time slot allocations may be signalled to the UE via broadcast signalling (e.g., in system information blocks), via point to point signalling (e.g., defining the timeslot parameters for a single or a multiplicity of allocations). The point to point signalling may be carried in radio resource control (RRC) messages, medium access control (MAC) messages (e.g., applied to High Speed Downlink Packet Access—HSDPA) or physical layer messages (similar to TFCI signalling).

Alternatively, the UE may autonomously determine the chip rate applied in a timeslot.

It will be further understood that each chip rate system may act independently of the other chip rate system (to the extent that any one chip rate would still function if the other chip rates were switched off in the frame: each chip rate is essentially controlled independently of the other chip rates), or one of the chip rates may operate collaboratively with another chip rate (the chip rates are controlled by a common controlling entity).

It will be further understood that although in Embodiment described above in relation to FIG. 7 two instantiations of lower chip rate functions are supported at different frequencies, the number of lower chip rate functions may be proportional the ratio of the bandwidth of the higher chip rate system to the bandwidth of the lower chip rate system.

It will be appreciated that the method for supporting a plurality of chip rates in a CDMA system described above may be carried out in software running on a processor (not shown) in a Node B or UE, and that the software may be provided as a computer program element carried on any suitable data carrier (also not shown) such as a magnetic or optical computer disc.

It will be also be appreciated that the method for supporting a plurality of chip rates in a code division multiple access (CDMA) system described above may alternatively be carried out in hardware, for example in the form of an integrated circuit (not shown) such as an FPGA (Field Programmable Gate Array) or ASIC (Application Specific Integrated Circuit) in the Node B or UE.

It will further be understood that although the preferred embodiments have been described above in the context of a UTRA TDD wireless system, the invention may be generally applied to any CDMA system supporting two or more chip rates.

It will be understood that the scheme for support of different chip rates described above provides the following advantages:

provides backwards compatibility of a network including higher chip rate functionality with existing lower chip rate user equipment.

allows greater network capacity during the transition phase from a low chip rate network to a high chip rate network.

allows a network operator with a high chip rate network to provide service to roaming users from low chip rate networks.

I claim:

1. A method for supporting communication between a base station and a plurality of user equipment sharing a plurality of timeslots in a communication frame and operable over a plurality of bandwidths, the method comprising:

allocating a user equipment at least a first one of a plurality of timeslots in a communication frame, each of the first one of the plurality of timeslots using a first bandwidth of the plurality of bandwidths and allocating the user equipment at least a second one of the plurality of timeslots in the communication frame, each of the second one of the plurality of timeslots using a second bandwidth of the plurality of bandwidths, said first bandwidth different from said second bandwidth.

2. The method of claim 1 wherein the method is further characterized by allocating a special timeslot for use in the first and second bandwidth.

3. The method of claim 1 wherein the first bandwidth is an integer multiple of the second bandwidth.

4. The method of claim 1 wherein the communication frame comprises beacon data in at least one of the plurality of timeslots.

5. The method of claim 1 wherein use of the first and second bandwidths of the plurality of bandwidths are controlled independently of each other.

6. The method of claim 1 wherein the first and second bandwidths of the plurality of bandwidths are commonly controlled.

7. The method of claim 1 wherein the method comprises transmitting a plurality of instantiations of the at least a first one of the plurality of timeslots in the communication frame using the first bandwidth.

8. The method of claim 7 wherein the plurality of instantiations are separated in the frequency domain.

9. The method of claim 7 wherein a number of the plurality of instantiations is proportional to a ratio of the second bandwidth to the first bandwidth.

10. The method of claim 1 wherein the method further comprises transmitting to the user equipment parameters of timeslots via broadcast signaling.

11. The method of claim 10 wherein transmitting to the user equipment parameters of timeslots comprises transmitting signals broadcast in system information blocks.

12. The method of claim 1 wherein the method further comprises transmitting to the user equipment parameters of timeslots via point to point signalling.

13. The method of claim 12 wherein the point to point signaling comprises at least one from a group consisting of:
    defining timeslot parameters for a single allocation;
    defining timeslot parameters for a multiplicity of allocations;
    a message carried in a radio resource control (RRC) message;
    a message carried in a medium access control (MAC) message; and
    a message carried in a physical layer message.

14. A base station supporting communication with a plurality of user equipment sharing a plurality of timeslots in a communication frame and operable over a plurality of bandwidths, the base station comprising:
    an allocation unit configured to allocate a user equipment at least a first one of a plurality of timeslots in a communication frame, each of the first one of the plurality of timeslots using a first bandwidth of the plurality of bandwidths and allocate the user equipment at least a second one of the plurality of timeslots in the communication frame, each of the second one of the plurality of timeslots using a second bandwidth of the plurality of bandwidths, said first bandwidth different from said second bandwidth.

15. User equipment for sharing a plurality of timeslots in a communication frame and operable over a plurality of bandwidths, the user equipment comprising:
    a receiver for receiving a signal from a base station directing the user equipment to use on a per timeslot or per communication frame basis at least a first one of the plurality of timeslots, each of the first one of the plurality of timeslots using a first bandwidth of the plurality of bandwidths and at least a second one of the plurality of timeslots in the communication frame, each of the second one of the plurality of timeslots using a second bandwidth of the plurality of bandwidths, said first bandwidth different from said second bandwidth.

16. The user equipment of claim 15, further comprising: a transmitter for transmitting an indication signal to the base station indicating that the user equipment is able to operate using the second bandwidth of the plurality of bandwidths.

17. The user equipment of claim 16, wherein the indication signal indicates that the user equipment is able to operate using both the first bandwidth of the plurality of bandwidths and the second bandwidth of the plurality of bandwidths.

18. The user equipment of claim 15, wherein the receiver is arranged to receive in the same communication frame the time slots in a first bandwidth and the timeslots in a second bandwidth.

19. The user equipment of claim 16, wherein the receiver is arranged to receive in the same communication frame the time slots in a first bandwidth and the timeslots in a second bandwidth.

20. A method for receiving communications sharing a plurality of timeslots in a communication frame and operable over a plurality of bandwidths, the method comprising, at a user equipment:
    receiving a signal from a base station directing the user equipment to use on a per timeslot or per communication frame basis at least a first one of the plurality of timeslots, each of the first one of the plurality of timeslots using a first bandwidth of the plurality of bandwidths and at least a second one of the plurality of timeslots in the communication frame, each of the second one of the plurality of timeslots using a second bandwidth of the plurality of bandwidths, said first bandwidth different from said second bandwidth.

21. A non-transitory computer readable recording medium having a computer program stored thereon, said computer program when executed performing the method of claim 1.

22. A non-transitory computer readable recording medium having a computer program stored thereon, said computer program when executed performing the method of claim 20.

23. An integrated circuit for a base station supporting communication with a plurality of user equipment sharing a plurality of timeslots in a communication frame and operable over a plurality of bandwidths, the integrated circuit comprising:
    an allocation unit operable to allocate a user equipment at least a first one of a plurality of timeslots in a communication frame, each of the first one of the plurality of timeslots using a first bandwidth of the plurality of bandwidths and allocate the user equipment at least a second one of the plurality of timeslots in the communication frame, each of the second one of the plurality of timeslots using a second bandwidth of the plurality of bandwidths, said first bandwidth different from said second bandwidth.

24. An integrated circuit for a user equipment for sharing a plurality of timeslots in a communication frame and operable over a plurality of bandwidths, the integrated circuit comprising:
    a receiver for receiving a signal from a base station directing the user equipment to use on a per timeslot or per communication frame basis at least a first one of the plurality of timeslots, each of the first one of the plurality of timeslots using a first bandwidth of the plurality of bandwidths and at least a second one of the plurality of timeslots in the communication frame, each of the second one of the plurality of timeslots using a second bandwidth of the plurality of bandwidths, said first bandwidth different from said second bandwidth.

* * * * *